US012773885B2

(12) United States Patent
Kamiya et al.

(10) Patent No.: US 12,773,885 B2
(45) Date of Patent: Oct. 27, 2026

(54) SUSPENSION ARM

(71) Applicant: TOYODA IRON WORKS CO., LTD., Toyota (JP)

(72) Inventors: Keisuke Kamiya, Toyota (JP); Michio Suzumori, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 0 days.

(21) Appl. No.: 19/112,268

(22) PCT Filed: Apr. 25, 2023

(86) PCT No.: PCT/JP2023/016349

§ 371 (c)(1),
(2) Date: Mar. 17, 2025

(87) PCT Pub. No.: WO2024/157491

PCT Pub. Date: Aug. 2, 2024

(65) Prior Publication Data

US 2026/0097618 A1 Apr. 9, 2026

(30) Foreign Application Priority Data

Jan. 24, 2023 (JP) ................................ 2023-008562

(51) Int. Cl.
*B60G 7/00* (2006.01)
*B60G 3/06* (2006.01)

(52) U.S. Cl.
CPC ............... *B60G 7/001* (2013.01); *B60G 3/06* (2013.01); *B60G 2206/0122* (2013.01);
(Continued)

(58) Field of Classification Search
CPC ...... B60G 7/001; B60G 7/00; B60G 2206/01; B60G 2206/70; B60G 2206/71;
(Continued)

(56) References Cited

U.S. PATENT DOCUMENTS 7,938,417 B2 5/2011 Ersoy et al.
2012/0315414 A1* 12/2012 Wesch ................ B62D 29/005 428/34.1
2014/0306418 A1 10/2014 Ottinger et al.
2016/0096409 A1* 4/2016 Bromme ............... F16D 65/128 280/124.134
(Continued)

FOREIGN PATENT DOCUMENTS

DE 102014205603 A1 * 10/2015 ............ B60G 7/001
DE 102014014837 A1 4/2016
(Continued)

OTHER PUBLICATIONS

Extended European Search Report dated Dec. 4, 2025, issued in European Patent Application No. 23918451.8.

*Primary Examiner* — Keith J Frisby

(57) ABSTRACT

A suspension arm includes a bottom wall, a first side wall and a second side wall that protrude upward from the bottom wall and face each other, and an airflow guide section that extends from the first side wall in a direction away from the second side wall. The first side wall includes a base end and a distal end. The base end is closer to the bottom wall in a protruding direction in which the first side wall protrudes from the bottom wall. The distal end is away from the bottom wall in the protruding direction. The airflow guide section extends from a portion of the first side wall between the base end and the distal end.

5 Claims, 6 Drawing Sheets

(52) U.S. Cl.
CPC .... *B60G 2206/10* (2013.01); *B60G 2206/162* (2013.01); *B60G 2206/7104* (2013.01); *B60G 2206/81012* (2013.01); *Y02T 10/82* (2013.01)

(58) Field of Classification Search
CPC .. B60G 2206/7104; B60G 2206/71042; B60G 2206/71043; B60G 2206/71044; B60G 2206/72; B60G 2206/80; B60G 2206/81; B60G 2206/8101; B60G 2206/81012; B60G 2206/8102; B60G 2206/8103; B60G 2206/10; B60G 2206/014; B60G 2206/82; B60G 2206/16; B60G 2206/161; B60G 2206/162; B60G 2206/012; B60G 2206/0122; B60G 2204/4308; B60G 3/00; B60G 3/02; B60G 3/04; B60G 3/06; B62D 35/02; B62D 29/004; Y02T 10/80; Y02T 10/82; Y02T 10/88
USPC ........ 280/124.1, 124.109, 124.134, 124.135; 296/180.1; 264/271.1, 274, 279.1
See application file for complete search history.

(56) References Cited

U.S. PATENT DOCUMENTS

| | | | | |
|---|---|---|---|---|
| 2020/0114987 | A1* | 4/2020 | Kitashiba | B62D 35/02 |
| 2020/0247204 | A1* | 8/2020 | Fortmeier | B60G 7/001 |

FOREIGN PATENT DOCUMENTS

| | | | | | |
|---|---|---|---|---|---|
| DE | 102015005501 | A1 | * | 11/2016 | B62D 35/02 |
| DE | 102015006112 | A1 | * | 11/2016 | B60G 21/055 |
| DE | 102021120595 | A1 | | 6/2022 | |
| EP | 3141408 | A1 | * | 3/2017 | B60G 7/001 |
| JP | 2000170744 | A | * | 6/2000 | |
| JP | 2004338458 | A | * | 12/2004 | |
| JP | 2006056463 | A | | 3/2006 | |
| JP | 2009029230 | A | * | 2/2009 | B60G 7/001 |
| JP | 2009196557 | A | * | 9/2009 | |
| JP | 2017087872 | A | * | 5/2017 | |
| KR | 20200141188 | A | * | 12/2020 | B60T 5/00 |
| WO | WO-2018093185 | A1 | * | 5/2018 | F16D 65/847 |

* cited by examiner

SUSPENSION ARM

CROSS-REFERENCE TO RELATED APPLICATIONS

This application is national stage application of International Application No. PCT/JP2023/016349, filed on Apr. 25, 2023, which claims the benefit of priority from Japanese Patent Application No. 2023-008562, filed on Jan. 24, 2023, the entire contents of each of which are incorporated herein by reference.

TECHNICAL FIELD

The present disclosure relates to a suspension arm.

BACKGROUND ART

Conventionally, a vehicle such as an automobile is equipped with suspension arms that connect wheels to the vehicle body.

A suspension arm described in Patent Literature 1 includes a main body and a cover bonded to the main body via vulcanization. The main body includes a bottom wall and two side walls, which project from the bottom wall and face each other. The cover covers the outward-facing surface of the bottom wall and the outward-facing surfaces of the side walls. A portion of the cover extends outward from the outward-facing surface at the base end of one of the side walls, in a direction away from the other side wall. This portion acts as a flow regulating member that reduces aerodynamic drag caused by oncoming airflow.

CITATION LIST

Patent Literature

Patent Literature 1: Japanese Laid-Open Patent Publication No. 2006-56463

SUMMARY OF INVENTION

Technical Problem

Patent Literature 1 does not address the influence of the shape of the cover on the aerodynamic characteristics of the suspension arm. Accordingly, there remains room for improvement in the aerodynamic characteristics of the suspension arm.

Solution to Problem

A suspension arm according to one aspect of the present disclosure includes a bottom wall, a first side wall and a second side wall that protrude upward from the bottom wall and face each other, and an airflow guide section that extends from the first side wall in a direction away from the second side wall. The first side wall includes a base end and a distal end. The base end is closer to the bottom wall in a protruding direction in which the first side wall protrudes from the bottom wall. The distal end is away from the bottom wall in the protruding direction. The airflow guide section extends from a portion of the first side wall between the base end and the distal end.

DESCRIPTION OF EMBODIMENTS

A suspension arm according to an embodiment will now be described with reference to FIGS. 1 to 12. In the present embodiment, the suspension arm is employed as a lower arm of a suspension device.

Suspension Device 10

Figure 2:
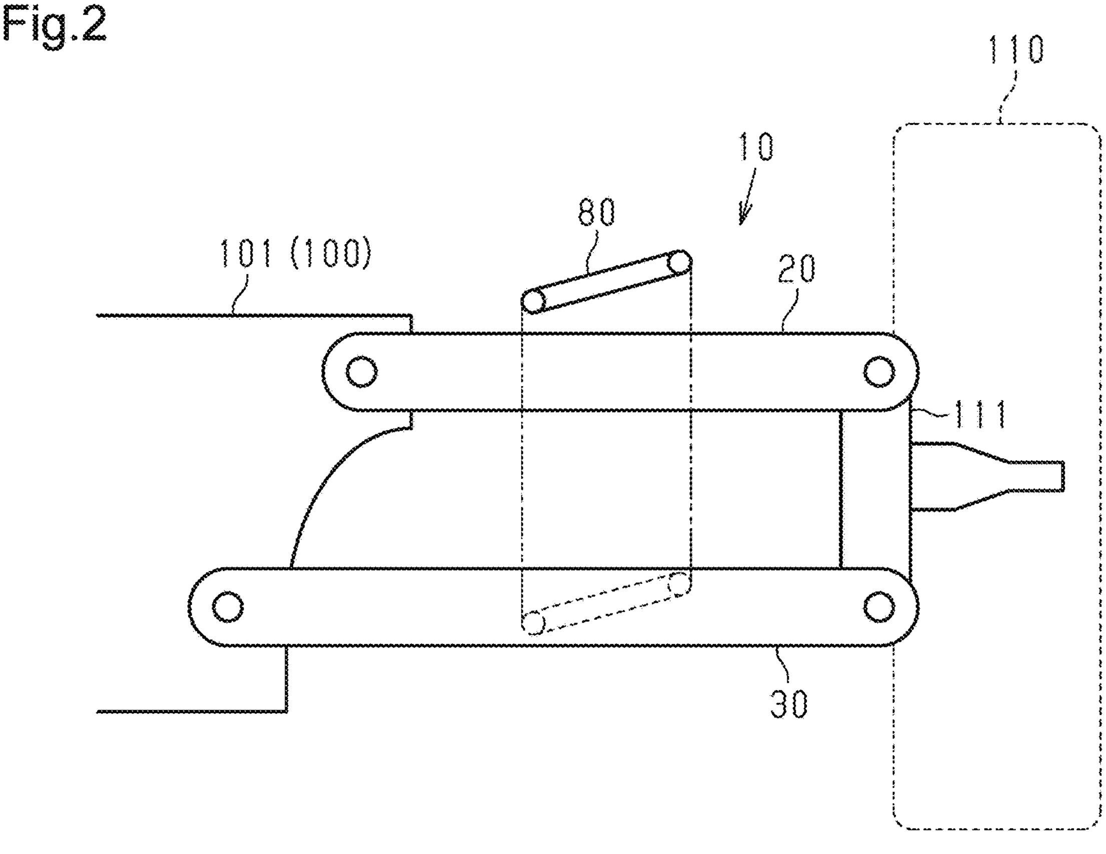
FIG. 2 is a schematic diagram showing a suspension device of a vehicle in which the lower arm shown in FIG. 1 is employed.

As shown in FIG. 2, a suspension device 10 is disposed between a vehicle body 100 and a wheel 110, and swingably supports the wheel 110 in relation to the vehicle body 100. The suspension device 10 is configured to mitigate an impact transmitted from the road surface to the vehicle body 100 via the wheel 110 and to press the wheel 110 against the road surface.

The suspension device 10 includes an upper arm 20, a lower arm 30, and a suspension spring 80.

The upper arm 20 and the lower arm 30 extend in the vehicle width direction. The upper arm 20 is disposed above the lower arm 30. The upper arm 20 and the lower arm 30 couple a support member 111 for supporting the wheel 110 to a frame 101 of the vehicle body 100.

The suspension spring 80 extends in a vertical direction. The lower end of the suspension spring 80 is supported by the lower arm 30.

Lower Arm 30

Figure 1:
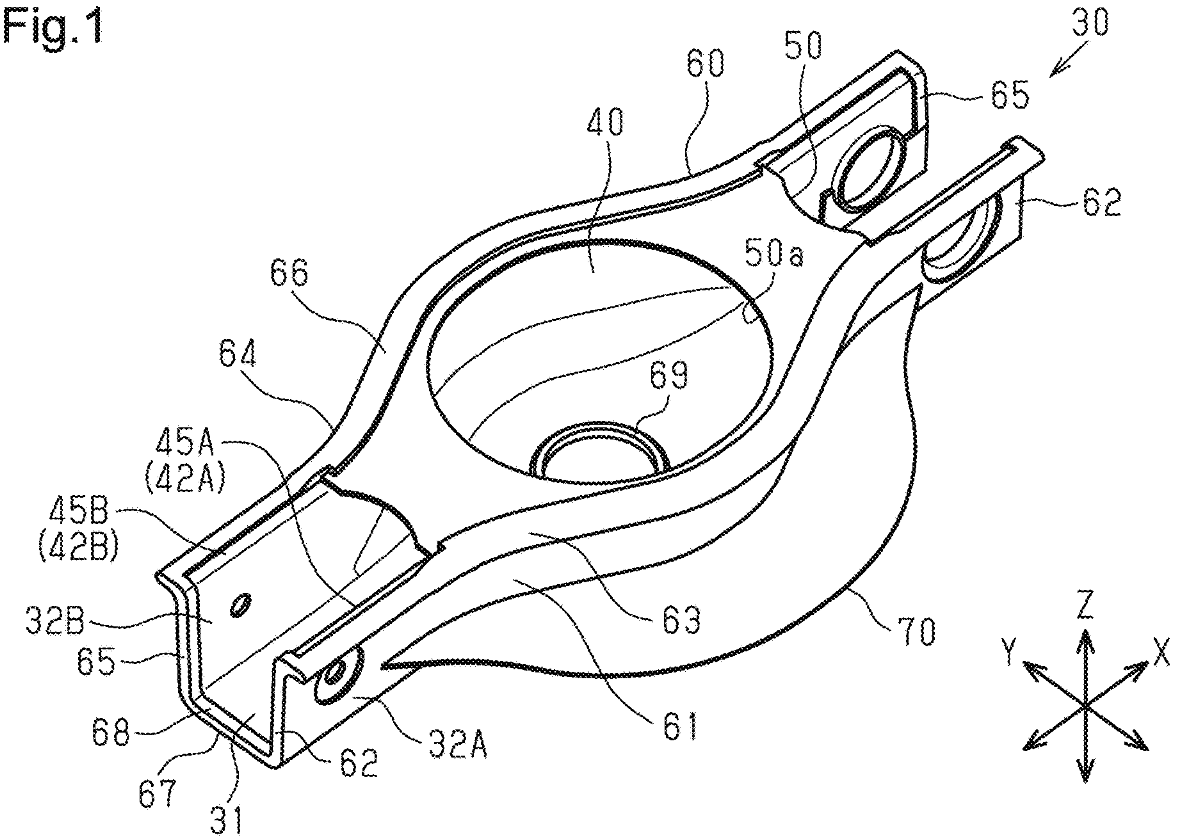
FIG. 1 is a perspective view of a lower arm that is a suspension arm according to an embodiment.

As shown in FIG. 1, the lower arm 30 includes a bottom wall 31, a first side wall 32A, a second side wall 32B, and an airflow guide section 70. The bottom wall 31 has an elongated shape extending in the vehicle width direction. The first side wall 32A and the second side wall 32B protrude upward from the opposite edges of the bottom wall 31 and face each other. The first side wall 32A and the second side wall 32B each include a base end and a distal end in a protruding direction from the bottom wall 31. The base end is located near the bottom wall 31, while the distal end is farther from the bottom wall 31. The airflow guide section 70 extends from the first side wall 32A in a direction away from the second side wall 32B.

The lower arm 30 is arranged such that the second side wall 32B is located forward of the first side wall 32A in the vehicle. Accordingly, the airflow guide section 70 extends toward the rear of the vehicle from the first side wall 32A.

Hereinafter, a direction in which the bottom wall 31 extends is referred to as an X-axis direction. A direction in which the first side wall 32A and the second side wall 32B face each other is referred to as a Y-axis direction. In addition, a direction that is orthogonal to both the X-axis direction and the Y-axis direction and in which the first side wall 32A and the second side wall 32B protrude is referred to as a Z-axis direction. The X-axis direction agrees with the vehicle width direction and corresponds to a "third direction". The Y-axis direction agrees with the longitudinal direction of the vehicle and corresponds to a "first direction". The Z-axis direction agrees with the vertical direction and corresponds to a "second direction".

The lower arm 30 includes an arm main body 40, a reinforcing member 50, and a molded plastic portion 60.

Arm Main Body 40

Figure 3:
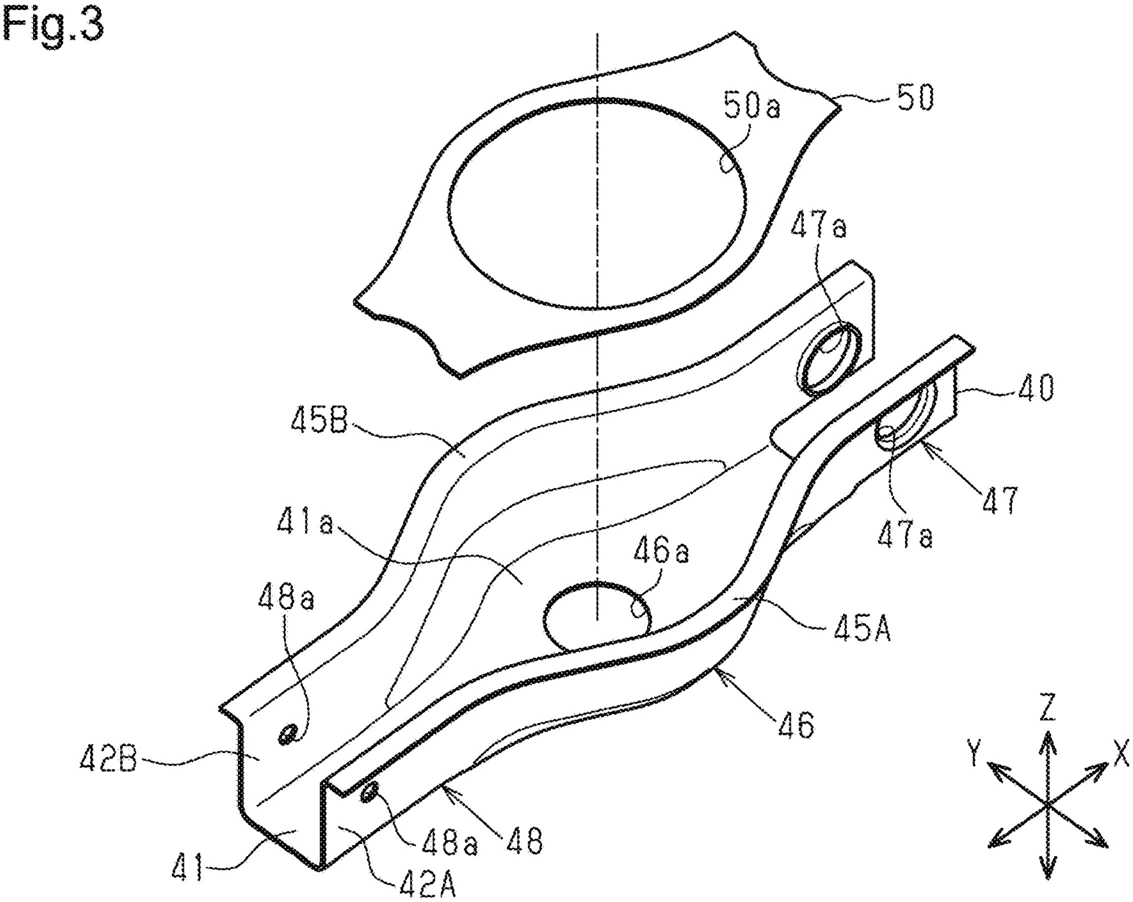
FIG. 3 is an exploded perspective view of an arm main body and a reinforcing member forming the lower arm shown in FIG. 1 in a separated state.

As shown in FIG. 3, the arm main body 40 includes a main body bottom wall 41, a first main body side wall 42A, and a second main body side wall 42B. The main body bottom wall 41 has an elongated shape extending in the X-axis direction. The first main body side wall 42A and the second main body side wall 42B protrude upward from the opposite edges, which are arranged in the Y-axis direction, of the main body bottom wall 41. The first main body side wall 42A and the second main body side wall 42B face each other. The arm main body 40 opens upward.

The arm main body 40 is formed by, for example, pressing a metal plate. The material of the arm main body 40 is, for example, a metal material such as high-tensile steel.

An intermediate portion 41*a* in the X-axis direction of the main body bottom wall 41 is wider in the Y-axis direction than the other portions. The width in the Y-axis direction of the intermediate portion 41*a* gradually decreases toward each of the opposite ends in the X-axis direction. The intermediate portion 41*a* of the main body bottom wall 41 has a spindle shape when viewed in the Z-axis direction.

Portions at the opposite ends in the X-axis direction of the main body bottom wall 41 adjacent to the intermediate portion 41*a* extend linearly in the X-axis direction.

The first main body side wall 42A and the second main body side wall 42B are symmetrical in the Y-axis direction. Accordingly, the configuration of the first main body side wall 42A will be described, and the description of the configuration of the second main body side wall 42B may be omitted.

The first main body side wall 42A extends over the entire main body bottom wall 41 in the X-axis direction. An end portion in the X-axis direction of the first main body side wall 42A that forms a first coupling portion 47 protrudes further in the X-axis direction than the main body bottom wall 41. The first coupling portion 47 will be discussed below.

Figure 5:
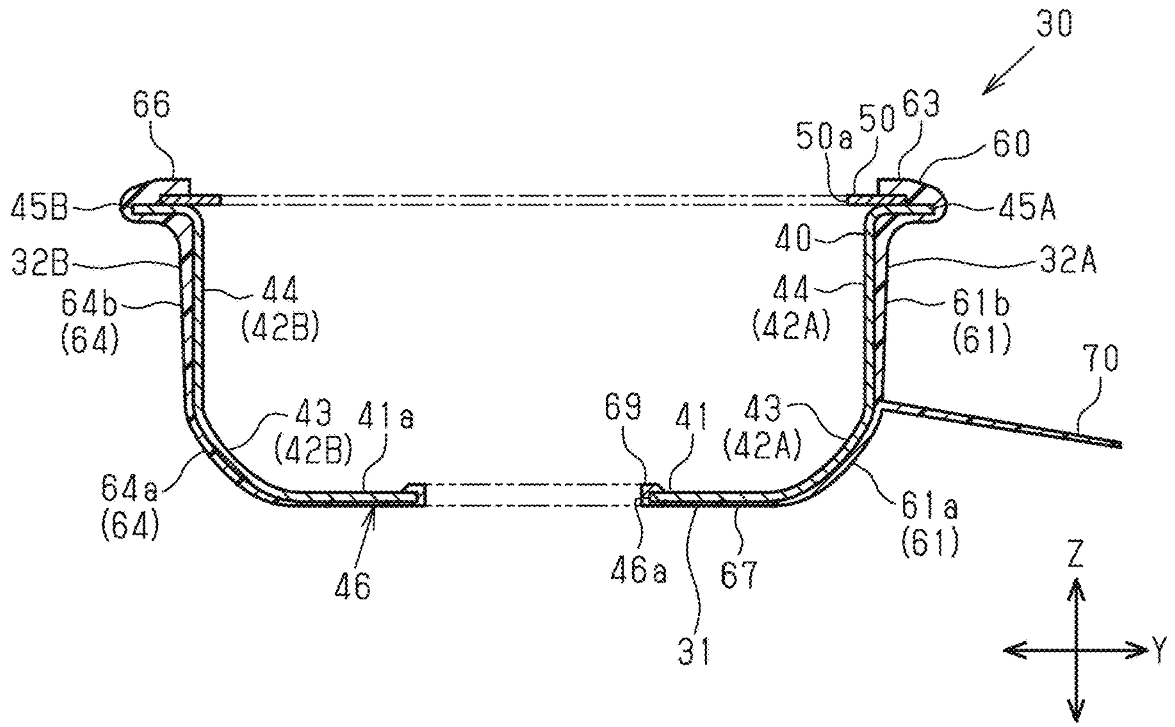
FIG. 5 is a cross-sectional view taken along line 5-5 of FIG. 4.

As shown in FIG. 5, a portion of the first main body side wall 42A protruding upward from the intermediate portion 41*a* includes an inclined portion 43, which is continuous with the main body bottom wall 41, and a linear portion 44, which is continuous with the inclined portion 43.

The inclined portion 43 is inclined so as to be separated from the second main body side wall 42B in the Y-axis direction as the inclined portion 43 extends upward. The inclined portion 43 includes a base end in the protruding direction of the first main body side wall 42A.

The linear portion 44 extends linearly in the Z-axis direction. The linear portion 44 of the first main body side wall 42A and the linear portion 44 of the second main body side wall 42B extend parallel to each other.

As shown in FIG. 3, the first main body side wall 42A and the second main body side wall 42B have a first flange 45A and a second flange 45B, respectively. The first flange 45A is located at an end of the first main body side wall 42A on the side opposite to the main body bottom wall 41 and extends in a direction away from the second main body side wall 42B in the Y-axis direction. The first flange 45A and the second flange 45B protrude away from each other in the Y-axis direction. The first flange 45A forms a distal end in the protruding direction of the first main body side wall 42A. The first flange 45A extends over the entire first main body side wall 42A in the X-axis direction.

The arm main body 40 includes a spring accommodating portion 46, a first coupling portion 47, and a second coupling portion 48. The spring accommodating portion 46 forms a central portion in the X-axis direction of the arm main body 40. The first coupling portion 47 and the second coupling portion 48 are provided at the opposite sides in the X-axis direction of the spring accommodating portion 46.

Spring Accommodating Portion 46

The spring accommodating portion 46 includes the intermediate portion 41*a*, a portion of the first main body side wall 42A that protrudes from the intermediate portion 41*a*, and a portion of the second main body side wall 42B that protrudes from the intermediate portion 41*a*. The spring accommodating portion 46 forms an accommodating space that accommodates the lower end of the suspension spring 80.

The portions of the first main body side wall 42A and the second main body side wall 42B that form the spring accommodating portion 46 bulge away from each other in the Y-axis direction.

The spring accommodating portion 46 includes a through-hole 46*a*, which extends in the Z-axis direction through the bottom, which is the intermediate portion 41*a*. The through-hole 46*a* has a circular shape.

First Coupling Portion 47

The first coupling portion 47 is a portion of the arm main body 40 that is coupled to the vehicle body 100. The first coupling portion 47 includes a portion of the first main body side wall 42A that protrudes further in the X-axis direction than the main body bottom wall 41 and a portion of the second main body side wall 42B that protrudes further in the X-axis direction than the main body bottom wall 41. The portions of the first main body side wall 42A and the second main body side wall 42B forming the first coupling portion 47 extend in the X-axis direction and are arranged parallel to each other. The portions of the first main body side wall 42A and the second main body side wall 42B forming the first coupling portion 47 protrude in the X-axis direction beyond the edge in the X-axis direction of the main body bottom wall 41.

Each of the portions of the first main body side wall 42A and the second main body side wall 42B forming the first coupling portion 47 is provided with a first coupling hole 47*a* extending therethrough in the Y-axis direction. The first coupling portion 47 is rotatably coupled to the frame 101 of the vehicle body 100 via a rotation shaft (not shown) inserted into the first coupling holes 47*a*.

Second Coupling Portion 48

The second coupling portion 48 is a portion of the arm main body 40 that is coupled to the wheel 110. The portions of the first main body side wall 42A and the second main body side wall 42B forming the second coupling portion 48 extend in the X-axis direction and are arranged parallel to each other.

Each of the portions of the first main body side wall 42A and the second main body side wall 42B forming the second coupling portion 48 is provided with a second coupling hole 48*a* extending therethrough in the Y-axis direction. The second coupling portion 48 is rotatably coupled to the support member 111 of the wheel 110 via a rotation shaft (not shown) inserted into the second coupling holes 48*a*.

Reinforcing Member 50

The reinforcing member 50 has the shape of a flat plate. The reinforcing member 50 covers the spring accommodating portion 46 from above. The reinforcing member 50 has a spindle shape when viewed in the Z-axis direction.

The material of the reinforcing member 50 is, for example, a metal material such as high-tensile steel.

The reinforcing member 50 is joined to the upper surfaces of the first flange 45A and the second flange 45B of the spring accommodating portion 46, for example, by welding.

Figure 4:
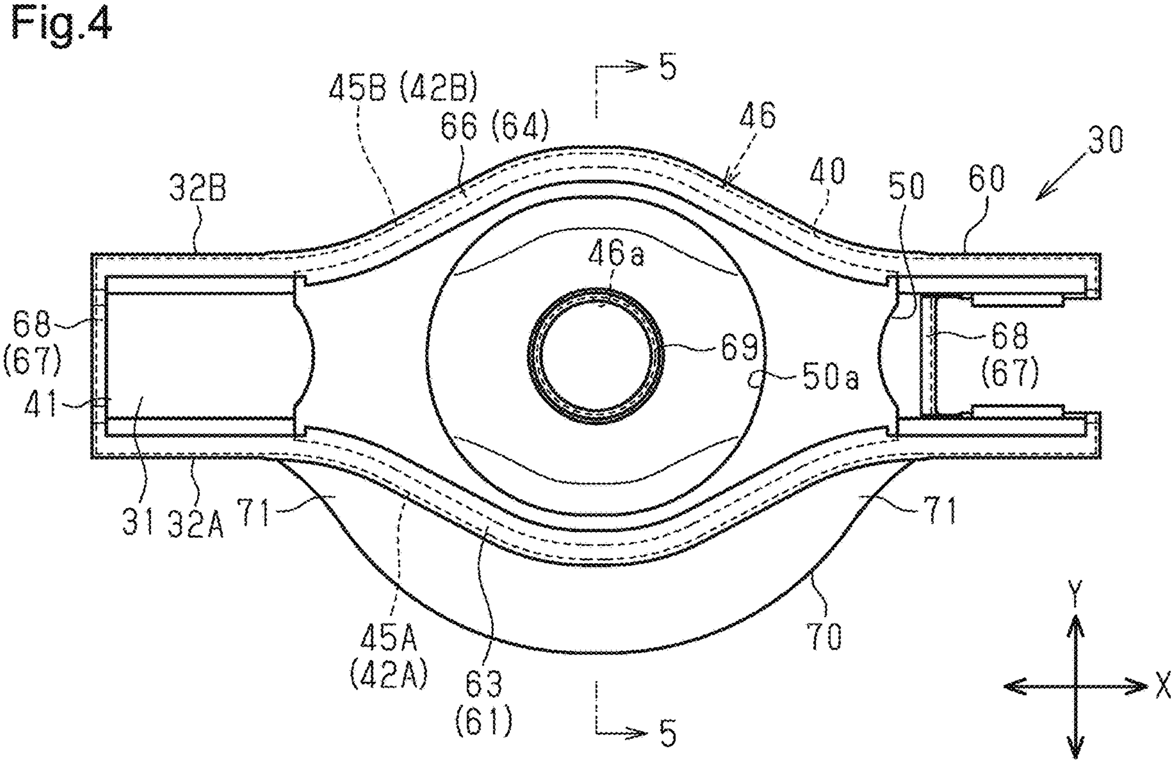
FIG. 4 is a plan view of the lower arm shown in FIG. 1.

As shown in FIG. 4, the opposite edges, which are arranged in the Y-axis direction, of the reinforcing member 50 are positioned inward of the edges, which are arranged in the Y-axis direction, of the first flange 45A and the second flange 45B of the spring accommodating portion 46.

The reinforcing member 50 includes an insertion hole 50*a*, into which the suspension spring 80 is inserted. The insertion hole 50*a* is continuous with the accommodating space of the spring accommodating portion 46.

Molded Plastic Portion 60

As shown in FIGS. 1 and 4, the molded plastic portion 60 is formed by injection molding using the arm main body 40 and the reinforcing member 50 as inserts. Specifically, the molded plastic portion 60 is molded by arranging the arm main body 40, to which the reinforcing member 50 is joined, inside a mold device (not shown) as an insert, and then filling the mold device with plastic.

The material of the molded plastic portion 60 is, for example, a thermoplastic material.

The molded plastic portion 60 includes a first covering portion 61, a second covering portion 64, and a third covering portion 67.

First Covering Portion 61

As shown in FIG. 5, the first covering portion 61 covers the outward-facing surface of the first main body side wall 42A. Specifically, the first covering portion 61 covers a portion of the outward-facing surface of the first main body side wall 42A excluding the peripheries of the first coupling hole 47*a* and the second coupling hole 48*a*. The outward-facing surface of the first main body side wall 42A is a surface opposite to the surface of the first main body side wall 42A that faces the second main body side wall 42B. The first covering portion 61 corresponds to a "covering portion".

The first covering portion 61 includes an inclined covering portion 61*a*, which covers the inclined portion 43 of the first main body side wall 42A, and a linear covering portion 61*b*, which covers the linear portion 44 of the first main body side wall 42A. The inclined covering portion 61*a* extends along the outward-facing surface of the inclined portion 43 of the first main body side wall 42A. The linear covering portion 61*b* extends along the outward-facing surface of the linear portion 44 of the first main body side wall 42A.

As shown in FIG. 1, the first covering portion 61 includes two engaging portions 62 and an engaging portion 63. The two engaging portions 62 respectively engage with the opposite ends, which are arranged in the X-axis direction, of the first main body side wall 42A. The engaging portion 63 engages with the distal end of the first flange 45A. The engaging portion 63 corresponds to an "engaging portion".

Each engaging portion 62 covers the corresponding end in the X-axis direction of the first main body side wall 42A from both sides in the Y-axis direction and from the corresponding side in the X-axis direction. Each engaging portion 62 engages with the corresponding end of the first main body side wall 42A over the entire extent in the Z-axis direction.

As shown in FIG. 5, the engaging portion 63 covers the distal end of the first flange 45A from both sides in the Z-axis direction and from a first side in the Y-axis direction. The engaging portion 63 engages with the distal end of the first flange 45A over the entire extent in the X-axis direction.

In the spring accommodating portion 46, the engaging portion 63 covers a joint portion between the first flange 45A and the reinforcing member 50 in addition to the distal end of the first flange 45A.

Second Covering Portion 64

As shown in FIG. 5, the second covering portion 64 covers the outward-facing surface of the second main body side wall 42B. Specifically, the second covering portion 64 covers a portion of the outward-facing surface of the second main body side wall 42B excluding the peripheries of the first coupling hole 47*a* and the second coupling hole 48*a*. The outward-facing surface of the second main body side wall 42B is a surface opposite to the surface of the second main body side wall 42B that faces the first main body side wall 42A.

The second covering portion 64 includes an inclined covering portion 64*a*, which covers the inclined portion 43 of the second main body side wall 42B, and a linear covering portion 64*b*, which covers the linear portion 44 of the second main body side wall 42B. The inclined covering portion 64*a* extends along the outward-facing surface of the inclined portion 43 of the second main body side wall 42B. The linear covering portion 64*b* extends along the outward-facing surface of the linear portion 44 of the second main body side wall 42B.

As shown in FIG. 1, the second covering portion 64 includes two engaging portions 65 and an engaging portion 66. The two engaging portions 65 respectively engage with the opposite ends, which are arranged in the X-axis direction, of the second main body side wall 42B. The engaging portion 66 engages with the distal end of the second flange 45B.

Each engaging portion 65 covers the corresponding end in the X-axis direction of the second main body side wall 42B from both sides in the Y-axis direction and from the corresponding side in the X-axis direction. Each engaging portion 65 engages with the corresponding end of the second main body side wall 42B over the entire extent in the Z-axis direction.

As shown in FIG. 5, the engaging portion 66 covers the distal end of the second flange 45B from both sides in the Z-axis direction and from a second side in the Y-axis direction, which is opposite to the first side. The engaging portion 66 engages with the distal end of the second flange 45B over the entire extent in the X-axis direction.

In the spring accommodating portion 46, the engaging portion 66 covers a joint portion between the second flange 45B and the reinforcing member 50 in addition to the distal end of the second flange 45B.

Third Covering Portion 67

As shown in FIG. 5, the third covering portion 67 covers the entire outward-facing surface of the main body bottom wall 41. The outward-facing surface of the main body bottom wall 41 is the lower surface of the main body bottom wall 41.

As shown in FIG. 4, the third covering portion 67 includes two engaging portions 68, which respectively engage with the opposite ends in the X-axis direction of the main body bottom wall 41, and an engaging portion 69, which engages with the peripheral edge of the through-hole 46*a*.

Each engaging portion 68 covers the corresponding end in the X-axis direction of the main body bottom wall 41 from both sides in the Z-axis direction and from the corresponding side in the X-axis direction. The engaging portions 68 engage with the corresponding end of the main body bottom wall 41 over its entire extent in the Y-axis direction.

As shown in FIG. 5, the engaging portion 69 covers the peripheral edge of the through-hole 46*a* from both sides in the Z-axis direction and from the inner side of the through-hole 46*a*. The engaging portion 69 engages with the peripheral edge of the through-hole 46*a* over the entire circumference.

The bottom wall 31 of the lower arm 30 includes the main body bottom wall 41 and the third covering portion 67. The first side wall 32A of the lower arm 30 includes the first main body side wall 42A and the first covering portion 61. The second side wall 32B of the lower arm 30 includes the second main body side wall 42B and the second covering portion 64.

Airflow Guide Section 70

The airflow guide section 70 extends from a portion of the first covering portion 61 that covers the outward-facing surface of the portion of the first main body side wall 42A forming the spring accommodating portion 46 in a direction away from the second side wall 32B. The airflow guide section 70 is provided integrally with the first covering portion 61. In other words, the airflow guide section 70 is seamlessly continuous with the first covering portion 61.

The airflow guide section 70 has the shape of a thin plate. The airflow guide section 70 extends from a portion of the first side wall 32A between the base end and the distal end in the protruding direction. The base end of the first side wall 32A is a portion of the first side wall 32A that is continuous with the bottom wall 31.

The airflow guide section 70 extends, for example, from the lower end of the linear covering portion 61*b* in the first covering portion 61, which is continuous with the inclined covering portion 61*a*. The airflow guide section 70 is, for example, inclined with respect to the horizontal direction so as to be lowered as the airflow guide section 70 extends away from the first side wall 32A in the Y-axis direction.

As shown in FIG. 4, the airflow guide section 70 has an elongated shape extending in the X-axis direction along the first side wall 32A. The airflow guide section 70 extends over the entire first side wall 32A of the spring accommodating portion 46 in the X-axis direction.

The airflow guide section 70 includes curved portions 71 at the opposite ends in the X-axis direction. Each curved portion 71 is curved such that the dimension of the curved portion 71 from the first side wall 32A gradually decreases as the curved portion 71 extends in the X-axis direction away from a central portion of the airflow guide section 70. The end in the X-axis direction of each curved portion 71 is connected to the outer surface of the first covering portion 61 without a step.

A portion of the airflow guide section 70 excluding the curved portions 71 is curved along the outer surface of the first side wall 32A of the spring accommodating portion 46.

Figure 6:
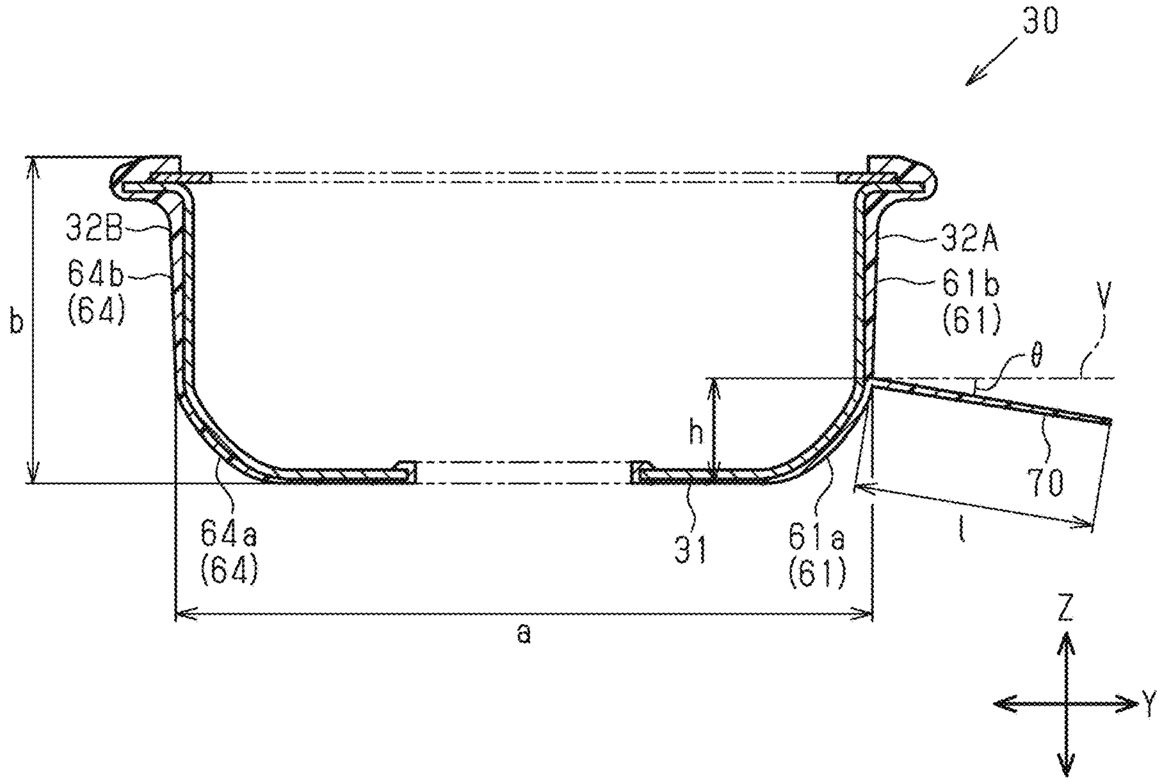
FIG. 6 is a cross-sectional view of a lower arm for explaining evaluation indices of aerodynamic characteristics in a simulation.

As shown in FIG. 6, the length l of the airflow guide section 70 from the first side wall 32A is shorter than a side wall distance a between the outward-facing surface of the first side wall 32A and the outward-facing surface of the second side wall 32B. The side wall distance a is the distance between the lower end of the linear covering portion 61*b* of the first covering portion 61 and the lower end of the linear covering portion 64*b* of the second covering portion 64.

The ratio of the airflow guide length l to the side wall distance a is set to be within a range of 30% to 60%, for example, in a portion excluding the opposite ends in the X-axis direction of the airflow guide section 70. The ratio of the airflow guide length l to the side wall distance a gradually increases from the central portion in the X-axis direction of the airflow guide section 70 toward each curved portion 71. In the central portion in the X-axis direction of the airflow guide section 70, the ratio of the airflow guide length l to the side wall distance a is set to, for example, approximately 30%. The length in the X-axis direction of a portion of the airflow guide section 70 at which the ratio of the airflow guide lengths l to the side wall distance a is within the range of 30% to 60% is, for example, half or more of the length in the X-axis direction of the first side wall 32A.

Simulation Results

The aerodynamic characteristics of the lower arm 30 when the airflow guide length 1, the airflow guide section height h, and the airflow guide angle θ of the airflow guide section 70 were changed will be described using simulation results.

As shown in FIG. 6, the airflow guide length l in this simulation was the length of a portion of the airflow guide section 70 that extends from the center in the X-axis direction of the first side wall 32A. The airflow guide section height h was the height from the lower surface of the bottom wall 31 to the base end of the airflow guide section 70. The airflow guide angle θ was an angle formed by an imaginary axis V extending in the Y-axis direction and the airflow guide section 70 when the airflow guide section 70 was viewed in the X-axis direction. When the airflow guide section 70 extended obliquely upward, the airflow guide angle θ had a positive value. When the airflow guide section 70 extended obliquely downward, the airflow guide angle θ had a negative value.

In this simulation, a length ratio R1 and a height ratio R2 were used as indices for evaluating the aerodynamic characteristics of the lower arm 30 with changes in the airflow guide lengths l and the airflow guide section height h. The length ratio R1 is the ratio (l/a) of the airflow guide length l to the side wall distance a. The height ratio R2 is the ratio (h/b) of the airflow guide section height h to the height b of the lower arm 30. The height b of the lower arm 30 is the height from the lower surface of the bottom wall 31 to the upper surfaces of the first side wall 32A and the second side wall 32B.

Figure 7:
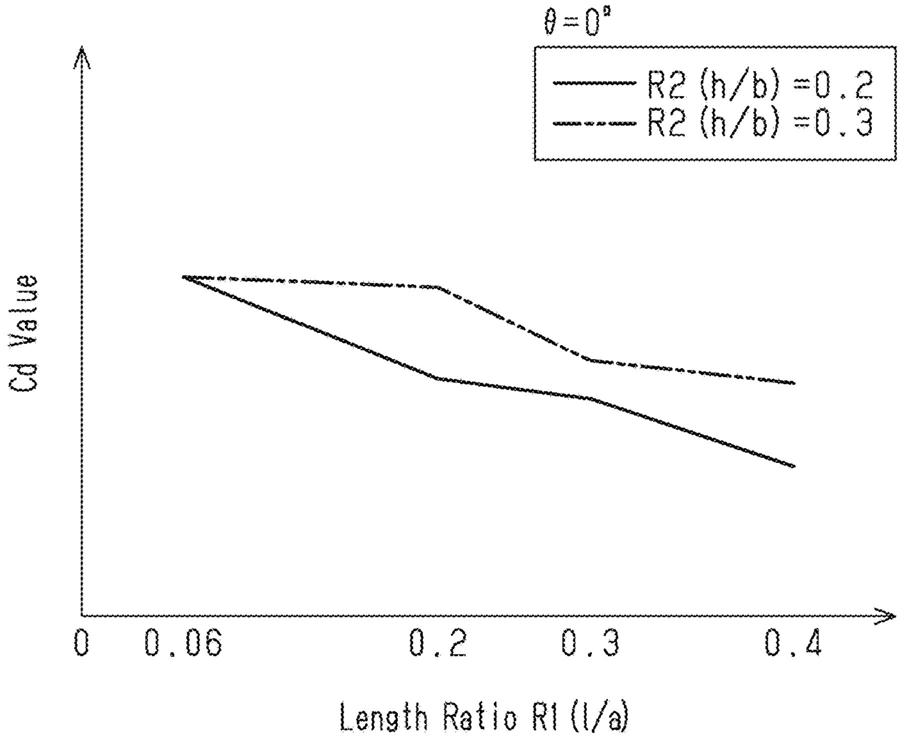
FIG. 7 is a graph showing the relationship between the length ratio and the Cd value of the airflow guide section in the lower arm shown in FIG. 6.

FIG. 7 is a graph showing changes in the Cd value, which is the coefficient of drag of the lower arm 30 (hereinafter, simply referred to as the Cd value), when the length ratio R1 was changed from 0.06 to 0.4 with the airflow guide angle θ set to 0°. The solid line in FIG. 7 represents a case in which the height ratio R2 was 0.2, and the long-dash double-short-dash line in FIG. 7 represents a case in which the height ratio R2 was 0.3.

As shown in FIG. 7, the Cd value was observed to decrease with an increase in the length ratio R1 (i.e., an increase in the airflow guide length l) for both values of the height ratio R2 (0.2 and 0.3). In this simulation, the Cd value was the lowest when the length ratio R1 was 0.4. When the length ratio R1 was 0.4, the Cd value for the height ratio R2 of 0.2 was lower than the Cd value for the height ratio R2 of 0.3.

Figure 8:
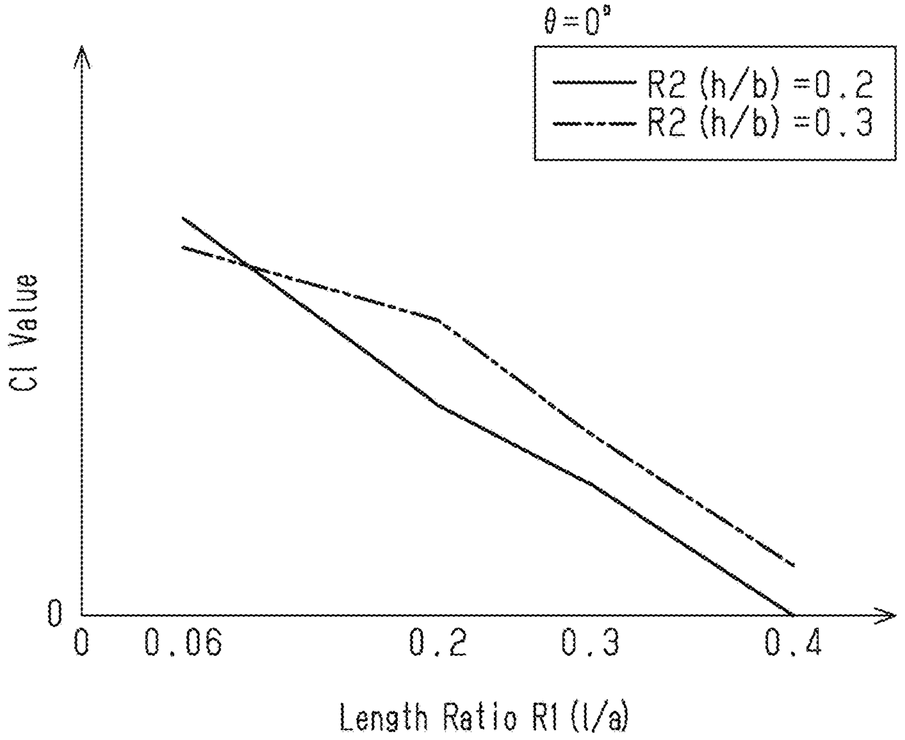
FIG. 8 is a graph showing the relationship between the length ratio and the Cl value of the airflow guide section in the lower arm shown in FIG. 6.

FIG. 8 is a graph showing changes in the Cl value, which is the coefficient of lift of the lower arm 30 (hereinafter, simply referred to as the Cl value), when the length ratio R1 was changed from 0.06 to 0.4 with the airflow guide angle θ set to 0°. The solid line in FIG. 8 represents a case in which the height ratio R2 was 0.2, and the long-dash double-short-dash line in FIG. 8 represents a case in which the height ratio R2 was 0.3.

As shown in FIG. 8, the Cl value was observed to decrease with an increase in the length ratio R1 (i.e., an increase in the airflow guide length l) for both values of the height ratio R2 (0.2 and 0.3). In this simulation, the Cl value was the lowest when the length ratio R1 was 0.4. When the length ratio R1 was 0.4, the Cl value for the height ratio R2 of 0.2 was lower than the Cl value for the height ratio R2 of 0.3.

Figure 9:
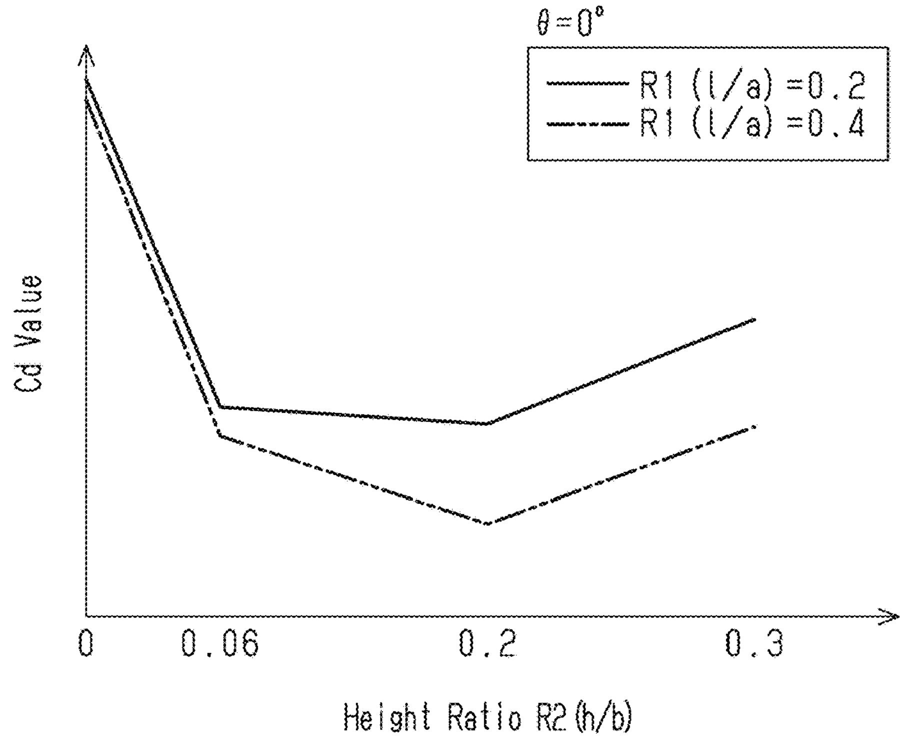
FIG. 9 is a graph showing the relationship between the height ratio and the Cd value of the airflow guide section in the lower arm shown in FIG. 6.

FIG. 9 is a graph showing changes in the Cd value when the height ratio R2 was changed from 0 to 0.3 with the airflow guide angle θ set to 0°. The solid line in FIG. 9 represents a case in which the length ratio R1 was 0.2, and the long-dash double-short-dash line in FIG. 9 represents a case in which the length ratio R1 was 0.4.

As shown in FIG. 9, when the length ratio R1 was 0.2 and when the length ratio R1 was 0.4, it was observed that the Cd value decreased as the height ratio R2 approached 0.2 from 0, and the Cd value increased as the height ratio R2 increased from 0.2. In this simulation, the Cd value was the lowest when the height ratio R2 was 0.2. When the height ratio R2 was 0.2, the Cd value for the length ratio R1 of 0.4 was lower than the Cd value for the length ratio R1 of 0.2. When the height ratio R2 is 0.2, the airflow guide section 70 extends from the inclined covering portion 61*a*. When the height ratio R2 is 0.3, the airflow guide section 70 extends from the linear covering portion 61*b*.

Figure 10:
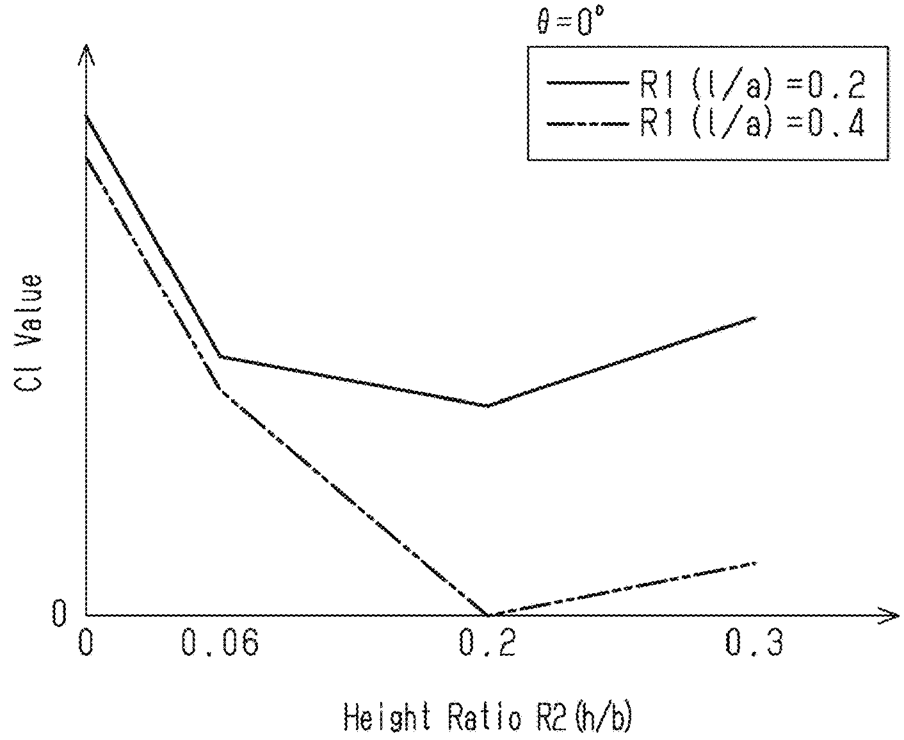
FIG. 10 is a graph showing the relationship between the height ratio and the Cl value of the airflow guide section in the lower arm shown in FIG. 6.

FIG. 10 is a graph showing changes in the Cl value when the height ratio R2 was changed from 0 to 0.3 with the airflow guide angle θ set to 0°. The solid line in FIG. 10 represents a case in which the length ratio R1 was 0.2, and the long-dash double-short-dash line in FIG. 10 represents a case in which the length ratio R1 was 0.4.

As shown in FIG. 10, when the length ratio R1 was 0.2 and when the length ratio R1 was 0.4, it was observed that the Cl value decreased as the height ratio R2 approached 0.2 from 0, and the Cl value increased as the height ratio R2 increased from 0.2. In this simulation, the Cl value was the lowest when the height ratio R2 was 0.2. When the height ratio R2 was 0.2, the Cl value for the length ratio R1 of 0.4 was lower than the Cl value for the length ratio R1 of 0.2.

When the height ratio R2 is 0, the airflow guide section 70 extends from the base end in the protruding direction of the first side wall 32A. Therefore, as shown in FIGS. 9 and 10, it was observed that when the height ratio R2 was greater than 0, that is, when the airflow guide section 70 extended from a portion between the base end and the distal end in the protruding direction of the first side wall 32A, the aerodynamic characteristics of the lower arm 30 were improved.

Figure 11:
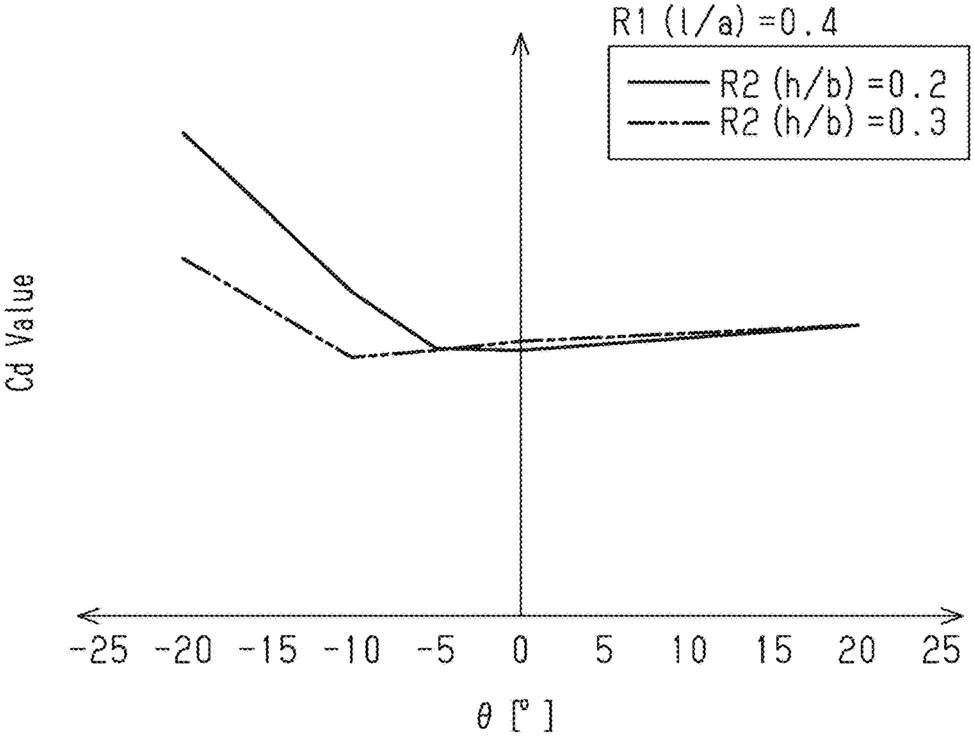
FIG. 11 is a graph showing the relationship between the airflow guide angle and the Cd value of the airflow guide section in the lower arm shown in FIG. 6.

FIG. 11 is a graph showing changes in the Cd value when the airflow guide angle θ was changed from −20° to 20° with the length ratio R1 set to 0.4. The solid line in FIG. 11 represents a case in which the height ratio R2 was 0.2, and the long-dash double-short-dash line in FIG. 11 represents a case in which the height ratio R2 was 0.3.

As shown in FIG. 11, when the height ratio R2 was 0.2, it was observed that the Cd value decreased as the airflow guide angle θ approached 0° from −20°, and the Cd value increased as the airflow guide angle θ increased from 0°. When the height ratio R2 was 0.3, it was observed that the Cd value decreased as the airflow guide angle θ approached −10° from −20°, and the Cd value increased as the airflow guide angle θ increased from −10°.

Figure 12:
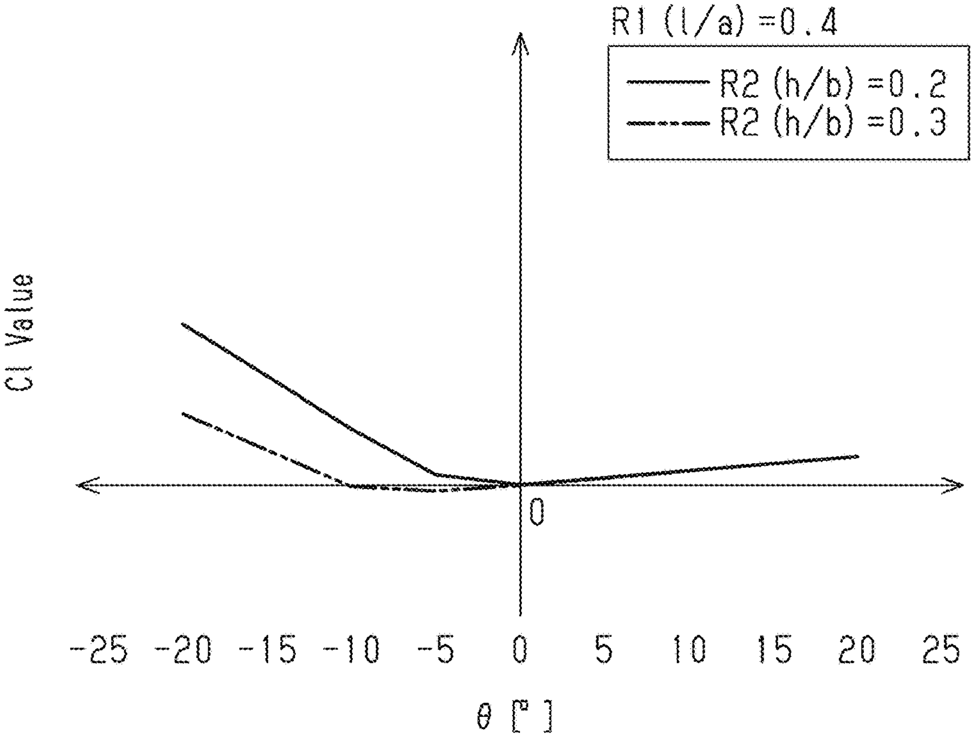
FIG. 12 is a graph showing the relationship between the airflow guide angle and the Cl value of the airflow guide section in the lower arm shown in FIG. 6.

FIG. 12 is a graph showing changes in the Cl value when the airflow guide angle θ was changed from −20° to 20° with the length ratio R1 set to 0.4. The solid line in FIG. 12 represents a case in which the height ratio R2 was 0.2, and the long-dash double-short-dash line in FIG. 12 represents a case in which the height ratio R2 was 0.3.

As shown in FIG. 12, when the height ratio R2 was 0.2, it was observed that the Cl value decreased as the airflow guide angle θ approached 0° from −20°, and the Cl value increased as the airflow guide angle θ increased from 0°. When the height ratio R2 was 0.3, it was observed that the Cl value decreased as the airflow guide angle θ approached −5° from −20°, and the Cl value increased as the airflow guide angle θ increased from −5°.

When the Cl value drops significantly below zero, the rolling resistance of the vehicle increases. Therefore, it is preferable that the Cl value be approximately 0. In a case in which the height ratio R2 was 0.2, the Cl value was approximately 0 when the airflow guide angle θ was 0°. In a case in which the height ratio R2 was 0.3, the Cl value was approximately 0 when the airflow guide angle θ was in a range of −10° to 0°.

From the foregoing, it is understood that by setting the length ratio R1 to 0.4, the height ratio R2 to 0.2, and the airflow guide angle θ to a range of −10° to 0°, the aerodynamic characteristics of the lower arm 30 are improved in an effective manner.

Operation and advantages of the present embodiment will now be described.

(1) The lower arm 30 includes the bottom wall 31, the first side wall 32A and the second side wall 32B, which protrude upward from the bottom wall 31 and face each other, and the airflow guide section 70, which extends from the first side wall 32A in a direction away from the second side wall 32B. The first side wall 32A includes the base end and the distal end. The base end is close to the bottom wall 31 in the protruding direction in which the first side wall 32A protrudes from the bottom wall 31. The distal end is away from the bottom wall 31 in the protruding direction. The airflow guide section 70 extends from a portion of the first side wall 32A between the base end and the distal end in the protruding direction.

With this configuration, when air flows from the second side wall 32B toward the first side wall 32A, the airflow is regulated by the airflow guide section 70, so that the drag generated in the lower arm 30 is reduced.

In addition, compared to a case in which the airflow guide section 70 extends from the base end of the first side wall 32A in a direction away from the second side wall 32B, the difference in the flow velocity of the air between the spaces positioned on the opposite sides of the airflow guide section 70 is increased. Specifically, the flow velocity in an upper space that is located above the airflow guide section 70 and is surrounded by the airflow guide section 70 and the first side wall 32A is lower than the flow velocity in a lower space that is located below the airflow guide section 70 and is surrounded by the airflow guide section 70 and the first side wall 32A. Accordingly, the pressure of the air in the upper space is higher than the pressure of the air in the lower space. This pressure difference suppresses an increase in the aerodynamic lift generated in the lower arm 30, thus improving aerodynamic characteristics of the lower arm 30.

(2) The lower arm 30 includes the arm main body 40 and the molded plastic portion 60, which is formed by injection molding using the arm main body 40 as an insert. The arm main body 40 includes the main body bottom wall 41, and the first main body side wall 42A and the second main body side wall 42B, which protrude upward from the main body bottom wall 41 and face each other. The molded plastic portion 60 includes the first covering portion 61, which covers the outward-facing surface of the first main body side wall 42A. The airflow guide section 70 is seamlessly continuous with the first covering portion 61.

With this configuration, the airflow guide section 70 can be molded as a part of the molded plastic portion 60, which is formed by injection molding using the arm main body 40 as an insert. Thus, an increase in the number of components of the lower arm 30 and an increase in the number of assembly steps are suppressed as compared to a case in which the airflow guide section 70 is manufactured separately from the arm main body 40 and subsequently attached to the arm main body 40. In addition, it is not necessary to align the arm main body 40 and the airflow guide section 70.

(3) The first covering portion 61 includes the engaging portion 63. The engaging portion 63 engages with the first flange 45A, which is the distal end in the protruding direction of the first main body side wall 42A.

With this configuration, the engaging portion 63 engages with the first flange 45A. As a result, positional displacement between the first main body side wall 42A and the first covering portion 61 is suppressed. Consequently, positional displacement between the arm main body 40 and the airflow guide section 70 is also suppressed. Accordingly, the airflow guide section 70 readily improves the aerodynamic characteristics.

(4) The airflow guide section 70 has an elongated shape extending in the X-axis direction along the first side wall 32A.

This configuration expands the range in which the airflow guide section 70 improves aerodynamic characteristics in the X-axis direction.

Additionally, the proportion of the opposite ends in the X-axis direction of the airflow guide section 70 relative to the entire airflow guide section 70 is reduced. This reduces the influence of drag on the airflow guide section 70, caused by vortices generated by airflow moving from the lower surface to the upper surface at the opposite ends in the X-axis direction of the airflow guide section 70. Accordingly, the aerodynamic characteristics of the lower arm 30 are improved.

(5) The opposite ends in the X-axis direction of the airflow guide section 70 are each provided with the curved portion 71, which is curved such that the dimension of the curved portion 71 from the first side wall 32A gradually decreases as the curved portion 71 extends in the X-axis direction away from the central portion of the airflow guide section 70.

This configuration readily suppresses the generation of vortices flowing from the lower surface to the upper surface at the opposite ends of the airflow guide section 70 in the X-axis direction, so that the drag generated at the opposite ends is reduced. Accordingly, the aerodynamic characteristics of the lower arm 30 are improved.

Modifications

The above-described embodiment may be modified as follows. The above-described embodiment and the following modifications can be combined as long as the combined modifications remain technically consistent with each other.

The curved portions 71 may be omitted from the airflow guide section 70. In this case, the opposite ends in the X-axis direction of the airflow guide section 70 may be connected to the outer surface of the first covering portion 61 via steps.

The airflow guide length l may be constant in the X-axis direction.

The airflow guide section 70 may have a shape elongated in the Y-axis direction when viewed in the Z-axis direction.

At least one of the engaging portions 62, 63, 65, 66, 68, and 69 may be omitted from the molded plastic portion 60.

The reinforcing member 50 may be omitted from the lower arm 30. In this case, the first main body side wall 42A and the second main body side wall 42B may lack the first flange 45A and the second flange 45B, respectively. In this case, the engaging portion 63 and the engaging portion 66 preferably engage with the distal end of the first main body side wall 42A and the distal end of the second main body side wall 42B.

The airflow guide section 70 may be detachable from the molded plastic portion 60.

The molded plastic portion 60 may be omitted from the lower arm 30. In this case, the airflow guide section 70 may be fixed to the first main body side wall 42A by welding or the like, or may be configured to be detachable from the first main body side wall 42A.

The configuration of the lower arm 30 may be adopted for the upper arm 20 of the suspension device 10.

The invention claimed is:

1. A suspension arm, comprising:

a bottom wall;

a first side wall and a second side wall that protrude upward from the bottom wall and face each other; and an airflow guide section that extends from the first side wall in a direction away from the second side wall, wherein the first side wall includes a base end and a distal end, the base end being closer to the bottom wall in a protruding direction in which the first side wall protrudes from the bottom wall, and the distal end being away from the bottom wall in the protruding direction, the airflow guide section extends from a portion of the first side wall between the base end and the distal end, the suspension arm further comprises:

an arm main body that includes a main body bottom wall, and a first main body side wall and a second main body side wall that protrude upward from the main body bottom wall and face each other; and a molded plastic portion that is formed by injection molding using the arm main body as an insert, the molded plastic portion includes a covering portion that covers an outward-facing surface of the first main body side wall, the bottom wall includes the main body bottom wall, the first side wall includes the first main body side wall and the covering portion, the second side wall includes the second main body side wall, and the airflow guide section is seamlessly continuous with the covering portion.

2. The suspension arm according to claim 1, wherein the covering portion includes an engaging portion that engages with the distal end of the first main body side wall.

3. A suspension arm, comprising:

a bottom wall;

a first side wall and a second side wall that protrude upward from the bottom wall and face each other; and an airflow guide section that extends from the first side wall in a direction away from the second side wall, wherein the first side wall includes a base end and a distal end, the base end being closer to the bottom wall in a protruding direction in which the first side wall protrudes from the bottom wall, and the distal end being away from the bottom wall in the protruding direction, the airflow guide section extends from a portion of the first side wall between the base end and the distal end, a direction in which the first side wall and the second side wall face each other is a first direction, a direction in which the first side wall protrudes is a second direction, a direction orthogonal to both the first direction and the second direction is a third direction, the first side wall extends in the third direction, and the airflow guide section has a shape of a thin plate and has an elongated shape extending in the third direction along the first side wall.

4. The suspension arm according to claim 3, wherein the airflow guide section includes curved portions at opposite ends in the third direction, each curved portion being curved such that a dimension of the curved portion from the first side wall gradually decreases as the curved portion extends in the third direction away from a central portion of the airflow guide section.

5. The suspension arm according to claim 3, wherein an angle formed by an imaginary axis extending in the first direction and the airflow guide section is an airflow guide angle, the airflow guide angle has a positive value when the airflow guide section is inclined toward the protruding direction as the airflow guide section extends from the first side wall in the direction away from the second side wall, the airflow guide angle has a negative value when the airflow guide section is inclined away from the protruding direction as the airflow guide section extends from the first side wall in the direction away from the second side wall, and the airflow guide angle is set in a range of $-10°$ to $0°$.

* * * * *